United States Patent [19]

Sandonato

[11] 4,101,991

[45] Jul. 25, 1978

[54] ENEMA WASTE RECEPTACLE AND FRAME

[76] Inventor: Saverio Sandonato, 50 Evans St., New Hyde Park, N.Y. 11040

[21] Appl. No.: 762,404

[22] Filed: Jan. 26, 1977

[51] Int. Cl.[2] ........................ A01G 9/02; A47C 21/00

[52] U.S. Cl. ........................................ 5/90; 5/317 R; 4/142

[58] Field of Search .......................... 5/90, 91, 92, 317; 4/142

[56] References Cited

U.S. PATENT DOCUMENTS

| | | | |
|---|---|---|---|
| 425,559 | 4/1890 | Adelmann | 5/90 UX |
| 735,135 | 8/1903 | McLennan | 5/90 |
| 1,219,158 | 3/1917 | Rose | 5/317 R |
| 2,071,155 | 2/1937 | Alexander | 5/317 R |
| 3,346,883 | 10/1967 | Ersek | 4/142 X |
| 3,739,793 | 6/1973 | Wilson | 5/92 |

FOREIGN PATENT DOCUMENTS

| | | | |
|---|---|---|---|
| 871,341 | 4/1942 | France | 5/317 R |
| 875,087 | 4/1953 | Fed. Rep. of Germany | 4/142 |

*Primary Examiner*—Peter M. Caun
*Attorney, Agent, or Firm*—Lyon & Lyon

[57] ABSTRACT

Described herein is a bed attachment useful for preventing soiling of bedding by waste matter and enema fluid when bedridden patients have recieved an enema. It is comprised of a flexible leak-proof receptacle which is held in an open position to receive the wastes by a frame about the perimeter of said receptacle. The receptacle is maintained flush with the side of the bed and level with its upper surface, and has a portion extending for a short distance over the surface of the bed for insertion beneath the patient. The frame which holds the receptacle flush with the side of the bed has a corresponding, substantially parallel, base portion inserted between the mattress and the mattress support means of the bed to support the article. These parallel portions of the frame form the article of this invention when joined to a section perpendicular to each of the parallel portions of the frame. The perpendicular section of the frame is held flush with the side of the mattress by said base portion during administration of the enema.

4 Claims, 3 Drawing Figures

ENEMA WASTE RECEPTACLE AND FRAME

BACKGROUND OF THE INVENTION

Traditionally, the most prevalent waste receptacle for bedridden patients in hospitals was the bedpan. While it was quite useful as a receptacle for most ordinary wastes such as urine and feces, it was less than satisfactory when an enema had been administered to the patient. In order for hospital personnel to administer an enema the patient must be either reclining on his side or on his back. After the patient has received the enema he must turn over and be lifted upon the bedpan. For many patients this is a trying experience because many are too incapacitated to really sit up easily and the maneuver is accompanied with a great deal of pain. While this shifting of the patient is occurring, enema fluid and waste material is leaking from the patient onto the bed. This virtually necessitates changing of the bed covers and cleansing the patient after each enema. As a result, the patient is subjected to a great deal of unnecessary discomfort and embarrassment. An additional problem inherent in the use of a bedpan occurred when the patient's condition was such that he was incapable of being moved from a reclining position and therefore unable to sit on the bedpan. In these cases, when a patient is subject to such incapacity a bedpan is totally unsatisfactory.

The prior art contains numerous, generally unsatisfactory, attempts to develop an apparatus which facilitates the discharge of wastes by bedridden patients after they have received an enema. Unfortunately, these prior art devices were cumbersome and involved a relatively large outlay of capital. The central theme in a great number of prior art devices is the incorporation of the waste receptacle into the center of the bed or mattress. A hospital was then faced with a difficult problem. If all the beds incorporate the prior art design, unnecessary expenses are incurred because not every bed needs to have a waste receptacle incorporated into it. On the other hand, if only a portion of the hospital's beds contain a waste receptacle, the attentions of hospital personnel must be diverted from patient care while a proper allotment of the prior art beds to the necessary patients is made. While hospitals in the past may have been able to make these expenditures, this is no longer the case. It has been increasingly apparent that, as inflation is driving up the cost of medical services, a more economical and easier to use device is needed to assist in keeping hospital costs in an affordable range for the public.

Examples of the numerous attempts by other workers to solve the problem of waste receptacles for bedridden patients are typified in such U.S. Pat. Nos. as Ishikawa, 3,943,583; Kappel, 3,323,146; Dickson, 2,618,787; Delisi et al, 2,533,774 and Marsan, 2,384,325. Each of these prior art patents incorporates a receptacle for wastes in the center of the bed. Ishikawa, 3,943,583, for instance, discloses a bed in which the main mattress is provided with a "through-hole" into which a commode or an auxiliary mattress may be positioned. On the other hand, Kappel, U.S. Pat. No. 3,323,146 teaches a hospital bed having a bedspring which is provided with an opening approximately at its center shaped to admit a bedpan. A receptacle in a cut-out center portion of the bed permits a patient to merely sit up to use the apparatus. These devices are satisfactory for ordinary patients who are capable of sitting upright but for those who must receive an enema or who are unable to leave a reclining position these devices may be used only with difficulty. An enema is administered to the patient while he is reclining on his side or on his back as previously noted. As the administration of an enema is often accompanied by leakage of the fluid and concomitant soiling of the bed as the patient is shifted to an upright position, these prior art devices were not satisfactory for they did not adequately prevent soiling when an enema was administered.

Other prior art patents are along the same lines as those noted above and, for the most part, also include an opening in the bed to receive wastes. However, these devices are directed towards assisting the patient into a comfortable position. These U.S. Pat. Nos. include Barnett, 3,503,083; Hiraga, 3,345,652; Beem et al, 2,699,772 and Beem et al, 2,500,743. Barnett, for example, provides an invalid's bed having foot and head sections which are each tiltably movable between a horizontal position and an approximately upright position. There is also a midsection wide enough to form a seat that remains in a horizontal position. Beem, U.S. Pat. No. 2,500,743 involves a bed having articulated parts that are movable to any number of varied positions wherein they cooperate to form a reclining seat for supporting a patient. Also, the prior art teaches the raising or lowering of the waste receptacle through the mattress by mechanical means. These U.S. Pat. Nos. include Kato, 3,922,735; Eckart et al, 2,674,747; Dry, 2,369,447 and Bruch, 1,918,896.

Frequently, a patient will be discharged from the hospital to recuperate at home. After incurring the cost of the hospitalization, many patients find it difficult to acquire the mechanized beds taught in the prior art. It is questionable whether the expense is warranted for a short convalescense. However, there is still a need for a waste receptacle that prevents soiling. As a result many people will rely on the ordinary bedpan for their needs and will encounter the difficulties already noted inherent in the use of a bedpan. Consequently, a light weight, low cost, easily installed enema waste receptacle was needed.

BRIEF DESCRIPTION OF THE INVENTION

This invention relates to a novel bed attachment to protect the bed and bedding from staining and soiling when an enema is administered to bedridden patients. This is accomplished by means of a flexible leak-proof receptacle which has a portion that is inserted beneath the patient's hips. The receptacle itself is inserted through a frame attached to the side of the bed. When the receptacle is placed onto the frame it is supported and held in an open position. The frame is adapted to being positioned on the side of a bed and level with its upper surface by means of a corresponding base portion generally parallel to the upper surface of the receptacle which is inserted between the mattress and the mattress support means, usually the frame or box spring of the bed.

DETAILED DESCRIPTION OF THE INVENTION

Figure 2:
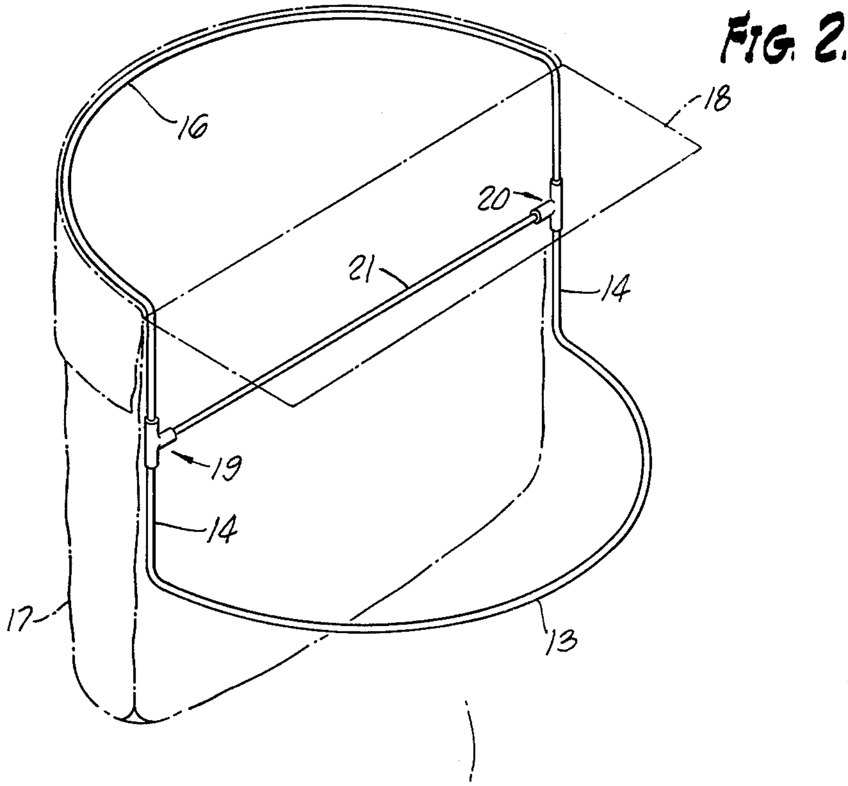
FIG. 2 shows a perspective view of the attachment prior to insertion between the mattress and the mattress support means.

The article according to the present invention is arranged in combination with a bed 10 having mattress support means 11, usually a frame or a box spring, upon which a mattress 12 is rested. A nurse or one caring for the patient prepares the article of the present invention by inserting between the mattress 12 and mattress support means 11 the base portion of the frame 13 so that the perpendicular side portion 14 is flush with the side of the bed 15. Through the upper portion of the frame 16 is inserted flexible leakproof receptacle 17 so that portion 18 extends over the surface of the mattress 9 and under the patient. This may be secured or fastened to the frame by an appropriate means. In one embodiment of the invention the receptacle is held in an open position solely by folding the receptacle over the frame and fastening it to the frame by an appropriate means such as by tape.

The frame may be comprised of steel or brass or other rigid, light weight material such as plastic, metal, wood, etc. Depending upon the shape of the flexible receptacle 17 the upper portion of the frame 16 may be, for example, either semicircular or rectangular in shape.

The flexible leakproof receptacle 17 may be made of any flexible material impervious to liquid and solid waste and the enema fluid. The receptacle 17 may be comprised of a plastic material such as polyethylene or a similar material and is preferably disposable after use. If a heavier material is utilized, such as rubber or a thicker gauge plastic, one may prefer to disinfect after administration of the enema and re-use. A means of sealing the receptacle after use may also be included. Portion 18 of the receptacle may also be designed in the form of a lip which extends over the surface of the bed.

The frame may be reinforced, if desired, by a member 21 which may be attached to the frame by means of "T" shaped joints 19 and 20. There may be, alternatively, a pair of reinforcement rods (not shown), one at the intersection of base portion 13 and perpendicular portion 14 and the other at the intersection of the upper portion of the frame 16 and the perpendicular portion 14.

Base portion 13 of the frame may correspond in shape to the upper portion of the frame 16 and should be large enough so that upon insertion between the mattress 12 and mattress support means 11 it will support the remainder of the framework. In one embodiment of the invention, the base portion 13 may have a shape identical to the upper portion of the frame 16. Thus, the nurse or attendant need not be concerned with which is the upper portion of the frame or the base portion during insertion into the bed.

When an enema is to be administered, the patient is positioned on his side with the portion 18 of the pouch underneath his hips. This permits the nurse or anyone caring for the patient to administer the enema without radically shifting the patient. Consequently, a patient in a weak condition need not be disturbed. When a bedpan is used or any of the devices of the prior art, the patient must change position after the enema has been administered. This may result in soiling of the bedding as fluid leaks from the patient. Also, when the patient is in a weakened condition and has been in a prone position for long periods of time, this change of position may result in dizziness or loss of consciousness. One practicing the present invention avoids these problems. Furthermore, the nurse or one administering the enema need not exert a great deal of strength in moving the patient into the proper position.

Figure 3:
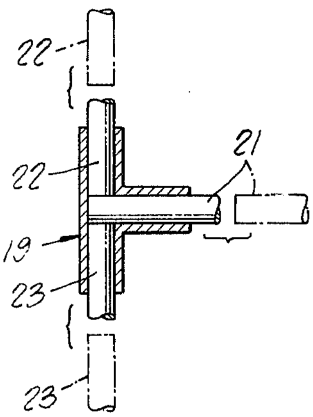
FIG. 3 shows a "T" joint suitable in assembling the attachment when the article is in kit form.
Figure 1:
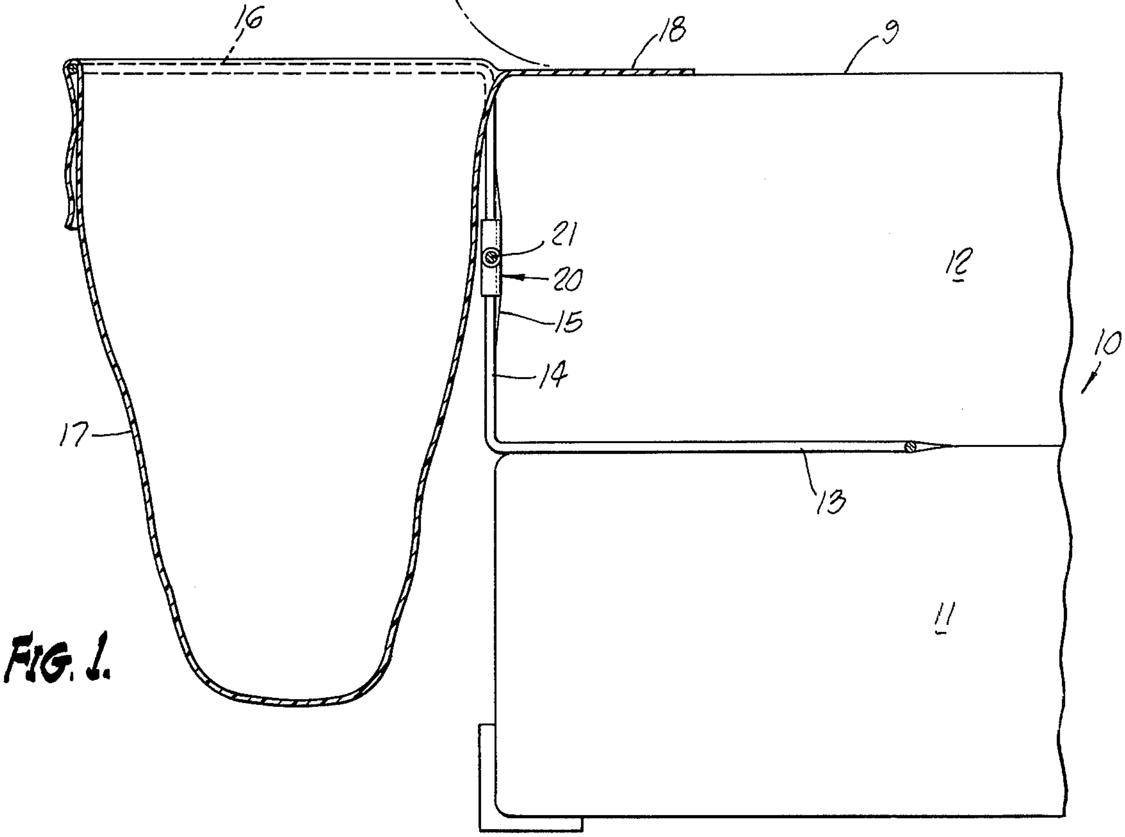
FIG. 1 shows a side view of the article positioned between the mattress and the mattress support means of a bed.

The article of the present invention may also be manufactured in a kit form which permits easy storage, assembly and installation by a nurse or one caring for the patient. In a preferred embodiment of the invention, the kit is such that upper portion 16 of the frame is rectangular in shape with members that may be inserted into "L" shaped joints (not shown). These side portions and joints may also be threaded for easy insertion and any other appropriate joining means may be used. A similar arrangement may be used for base portion 13. Perpendicular portion 14 may also be joined to upper portion 16 and base portion 13 by the same "L" shaped joints. When a reinforcement bar 21 is used between 19 and 20, a "T" joint 19 may be used to secure it to the frame. Also, perpendicular portion 14 may be comprised of two parts 22 and 23 as shown in FIG. 3.

While I have illustrated and described the preferred embodiments of my invention, it will be understood that the invention is not limited thereto, but only to the lawful scope of the appended claims.

I claim:

1. An attachment for a bed having a mattress and a mattress support means, the improvement comprising in combination, a frame and a flexible leakproof receptacle, having a lip, to permit a reclining patient to discharge wastes, said frame having a base portion projecting between the mattress and the mattress support means, a center section connected to said base portion, such that said center portion is perpendicular to said base portion and held flush against the side of the mattress when said base portion is inserted between the mattress and the mattress support means and an upper portion extending outwardly from said center portion, said upper portion being perpendicular to said center portion and parallel to said base portion and supporting said receptacle, such that said receptacle is held flush with the side of the mattress and generally level with the upper surface of the mattress, and holding its open end in an open position to receive wastes, said portion of the receptacle extending along the surface of the mattress is in the form of a lip.

2. A bed attachment according to claim 1 wherein said receptacle is plastic.

3. A bed attachment according to claim 1 wherein said frame is plastic.

4. A bed attachment according to claim 1 wherein said frame is metal.

* * * * *